Aug. 4, 1964          W. L. BROWN          3,143,455
LAMINATED WOOD AND SLATE STRUCTURE
Filed June 28, 1961                    2 Sheets-Sheet 1
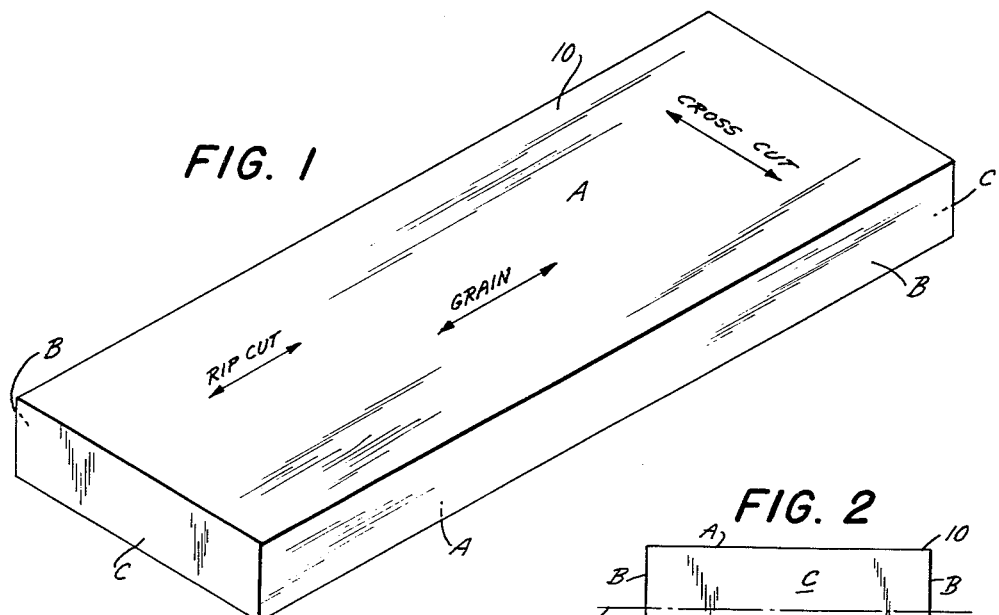
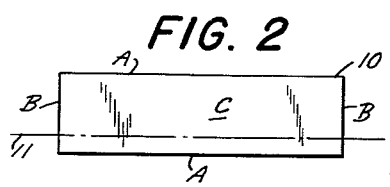
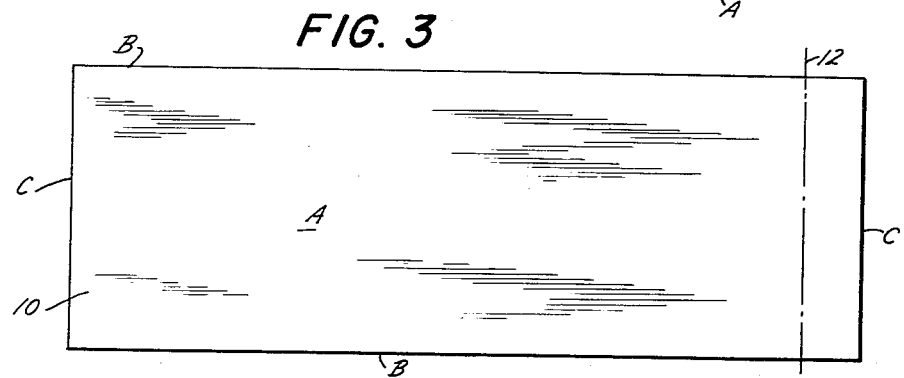
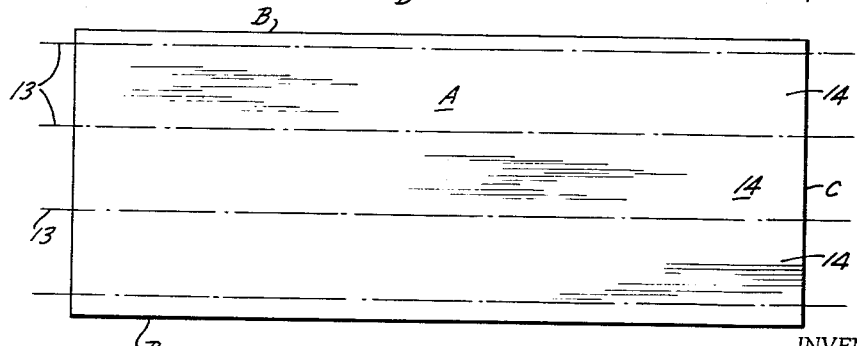
INVENTOR.
WINTHROP L. BROWN
BY
Kane, Dalsimer and Kane
ATTORNEYS Aug. 4, 1964 W. L. BROWN 3,143,455
LAMINATED WOOD AND SLATE STRUCTURE
Filed June 28, 1961 2 Sheets-Sheet 2

INVENTOR.
WINTHROP L. BROWN
BY
Kane, Dalsimer and Kane
ATTORNEYS

United States Patent Office 3,143,455
Patented Aug. 4, 1964

3,143,455
LAMINATED WOOD AND SLATE STRUCTURE
Winthrop L. Brown, 49 Winter St., Topsham, Maine
Filed June 28, 1961, Ser. No. 126,779
2 Claims. (Cl. 161—56)

This invention relates to a laminated product.

By means of the present teachings, an assembly is furnished which will have an extremely attractive appearance. It will have diversity of uses in that it may be advantageously incorporated in elements of buildings such as floors, stairs and treads, walls, etc. as well as in furniture and giftware, such as decks for tables, sideboards, counters, boxes and cabinets, trays and in manifold other associations.

So employed, it will have a long effective life, and with even minimal care present an extremely attractive appearance, aside from the fact that it may be produced at a comparatively low cost.

With these and other objects in mind, reference is had to the attached sheets of drawings illustrating practical embodiments of the invention and in which:

FIG. 1 is a perspective view of a layer or slab of stone;

FIG. 2 is an end view thereof;

FIG. 3 is a face view illustrating the manner in which the unit is treated so that it will incorporate a desired length;

FIG. 4 is a view similar to FIG. 1 but showing the manner in which the stone block is subdivided to embrace a desired width;

Figure 5:
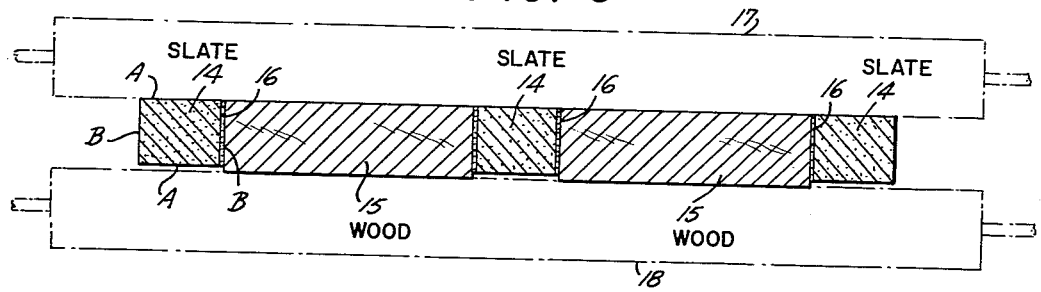
FIG. 5 is a sectional edge view of a laminated structure as herein contemplated and in process of being finished.

The laminated structure herein contemplated embraces layers of stone and wood bonded to each other. It is preferred that the stone be slate. In any event, it should incorporate a definite grain. Where slate is employed, the color should be non-fading, preferably dark grey in color, and when oiled, black. The texture should be fine-grained, uniform and smooth-splitting. It should incorporate a modulus of rupture across the grain of around 14,400 per square inch and parallel to the grain around 8,650 per square inch.

Also, it should present the quality of being superior in resistance to decay by freezing and thawing as well as under natural weathering conditions. Insofar as "workability" is concerned, it should also be superior. The grain texture should be uniform and banding or "ribbon" structure should not exist. Additionally, it is preferred that it incorporate extreme fineness of mineral grain size and low porosity, coupled with a low content of unstable and undesired materials. Slate of this type is known as "Harpswell House" or "Monson Slate." This originates from a seam of slate in North-Central Maine, which is mined in Monson, Maine. Slate from other sections of the country has also been found to be suitable in the practice of the present method and production of the final structures or assemblies.

Thus, referring to FIG. 1 it will be seen that there has been illustrated a layer or slab 10 of slate. This will present upper and lower faces A, side edges B, and end edges C. It will incorporate a grain, as indicated in that view. Therefore, and as also indicated, by a rip cut operation, severance in a length-wise direction may be effected, while by a cross-cut technique transverse severance is feasible. It is contemplated that this slab or layer, as shown in FIG. 1 will be in an unfinished condition.

As shown in FIG. 2, the slab or layer 10 may be split along the line indicated at 11 so that its body will be reduced to approximately proper thickness. Also, as shown in FIG. 3, layer 10 may be severed along line 12 so as to be rough cut for length. It will be apparent in connection with the steps illustrated in both FIGS. 2 and 3 that, while they have been described as involving rough cuts, in certain instances these might be finished cuts if desired.

In any event, and as diagrammatically shown in FIG. 4, the layer 10 of material is now subjected to cuts along the lines indicated at 13 so that it is reduced into sections of desired width suitable for incorporation in the finished structure. These should be finished cuts or, in other words, result in edge portions, which require no additional treatments. In this connection, it is to be understood that the grain in the slate is very much like the grain of wood. Those faces of the stone which are parallel to the split surface can be finished by dry sanding through the employment of suitable abrasives such as silicon carbide. Accordingly, laminates of wood and slate can be simultaneously finished or dressed down to a desired dimension and surface. Those faces of the stone which are vertical to the split surfaces provide the strongest glue bonds. Various types of glue or cement may be employed, such as those incorporating a water base, a solvent base, and thermosetting properties. It is preferred to employ a cement or bonding agent such as epoxy resin.

As will be understood from FIGS. 1 to 4, it is therefore apparent that upper and lower surfaces A being parallel with the plane of cleavage may be readily sanded in a manner corresponding to the treatment of wood. Edge surfaces B are vertical to the cleavage plane but parallel to the grain. They provide proper surfaces in contact with bonding agents and result in stronger joints than surfaces A because they are vertical to the cleavage plane. Also, they do not sand as readily as surfaces A. Surfaces C are normally the ends of the panel. As in wood, slate crosscuts better than it rips. These surfaces do not respond to sanding treatment as well as surfaces B.

Now considering the production of a finished assembly. Strips or blocks such as 14 are provided. Similarly, wood strips, blocks or layers are provided. It will be borne in mind that the lines of severance indicated at 13 will be such as to provide for a finish cut. If this were not done difficulty would be experienced in producing the desired laminated structure in that uniformity of the pattern might be destroyed.

The strips of wood and slate are disposed alternately with their side edges facing each other. A bonding agent such as epoxy resin is suitably applied to these edges and allowed to set to furnish a unitary structure. This has been illustrated in FIG. 5, wherein the strips or blocks 14 of slate have been shown with layers of wood 15 interposed between them. Also in this view, the cement or bonding agent has been shown in the form of relatively thin layers 16 intervening adjacent side edges of the panels or units.

Sanders of the drum type have been indicated at 17 and 18 in contact with the upper and lower faces of the assembly. While apparatus such as this is in most instances preferable for dressing the top and bottom surfaces, alternative apparatus may be employed such as, for example, a thickness planer where the wood extends beyond the stone. Sanders such as 17 and 18 should be used with an abrasive such as silicon carbide. The operation should be continued until the desired finished dimension is achieved.

Figure 6:
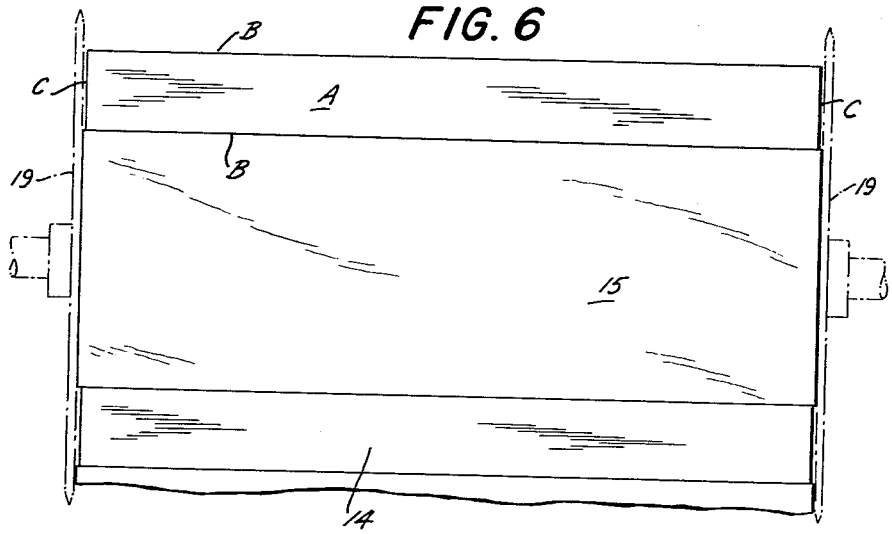
FIG. 6 is a fragmentary plan view of a unit as shown in FIG. 5 illustrative of a further finishing step.

It is apparent that where the assembly is suitably backed up by a proper material only the top surface need be dressed. In this case, the sander 18 may be dispensed with. The dressed laminate is crosscut to finished length. For this purpose, diamond or carborundum abrasive wheels, such as 19 in FIG. 6, may be employed. These are conveniently water-cooled. It is, of course, obvious that the unit may be subdivided into multiples of the finished length. Thereafter, it may be cut off into individual desired lengths. In order to reduce moisture pick-up by the wood, a protective coating such as waxed paper or oil or lacquer may be applied to the assembly.

Figure 7:
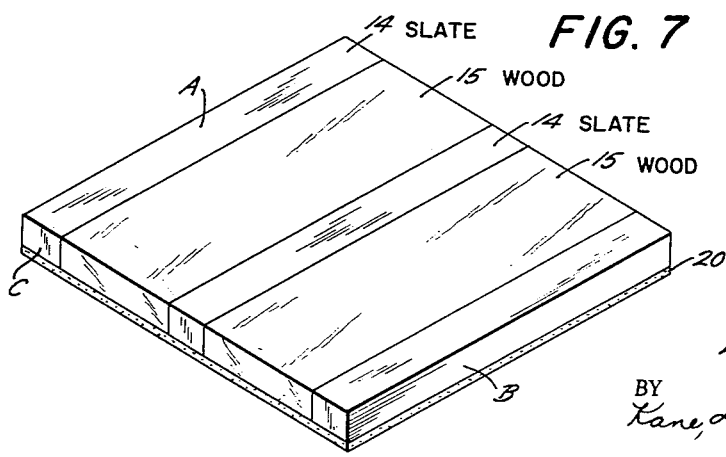
FIG. 7 is a perspective view of a finished structure or a portion of the same.

Thus, a finished product is provided as illustrated in FIG. 7. This product may embrace any desired outline, although it will ordinarily be rectangular. A backing layer 20 has been shown as part of the unit. As afore brought out, if a backing is employed it is ordinarily unnecessary to resort to a finishing of the lower face of the assembly. Also, in certain instances where that lower face will be concealed from view, such finishing is unnecessary. Finally, it is to be noted that, according to the present teachings, the grain of the wood strips or panels 15 should run in the same direction as the grain of the slate or similar stone.

Thus, among others, the several objects of the invention as specifically aforenoted are achieved. It is apparent that numerous changes in construction and rearrangements of the parts may be resorted to and that the steps of the method may be varied without departing from the spirit of the invention as defined by the claims.

What I claim is:

1. A laminated wood and slate structure comprising blocks of fine grained, uniform and smooth-splitting slate having opposite face surfaces parallel to the cleavage plane and to the grain of the slate, side surfaces perpendicular to the cleavage plane and parallel to the grain and end surfaces extending transversely of the cleavage plane and the grain and blocks of wood having face and side surfaces parallel to the grain of the wood and end surfaces extending transversely of the grain, said slate and wood blocks being laminated together in alternate relationship by a bonding agent having affinity for both the slate and the wood with the side surfaces of the respective blocks being in adjacent, confronting relationship and with the face surfaces being exposed on opposite faces of the laminated assembly and having the grain of the wood and slate in parallel relationship and with the cleavage plane of the slate parallel to the faces of the assembly, the faces of the laminated assembly having dressed, smooth and finished surfaces and with the face surfaces of the slate and wood being in a common plane.

2. A laminated wood and slate structure comprising: a block of fine grained, uinform and smooth-splitting slate having opposite face surfaces parallel to the cleavage plane and to the grain of the slate, side surfaces perpendicular to the cleavage plane and parallel to the grain and end surfaces extending transversely of the cleavage plane and the grain and a block of wood having face and side surfaces parallel to the grain of the wood and end surfaces extending transversely of the grain, said blocks being laminated together with a bonding agent having affinity for both the slate and the wood and with the face surfaces of the slate and wood exposed on opposite faces of the laminated assembly and having the grain of the wood and slate in parallel relationship, and the exposed face surfaces of the slate and wood being smooth, dressed and finished and disposed in a common plane.

References Cited in the file of this patent
UNITED STATES PATENTS

| | | |
|---|---|---|
| 1,839,535 | Curran | Jan. 5, 1932 |
| 2,572,772 | Skoog | Oct. 23, 1951 |
| 2,729,584 | Foster | Jan. 3, 1956 |
| 2,932,596 | Rayner | Apr. 12, 1960 |